June 23, 1970   P. E. MORGAN   3,516,392
OSCILLATING PISTON INTERNAL COMBUSTION ENGINE
Filed July 1, 1968   5 Sheets-Sheet 1

INVENTOR
PAUL E. MORGAN
BY George B White
ATTORNEY.

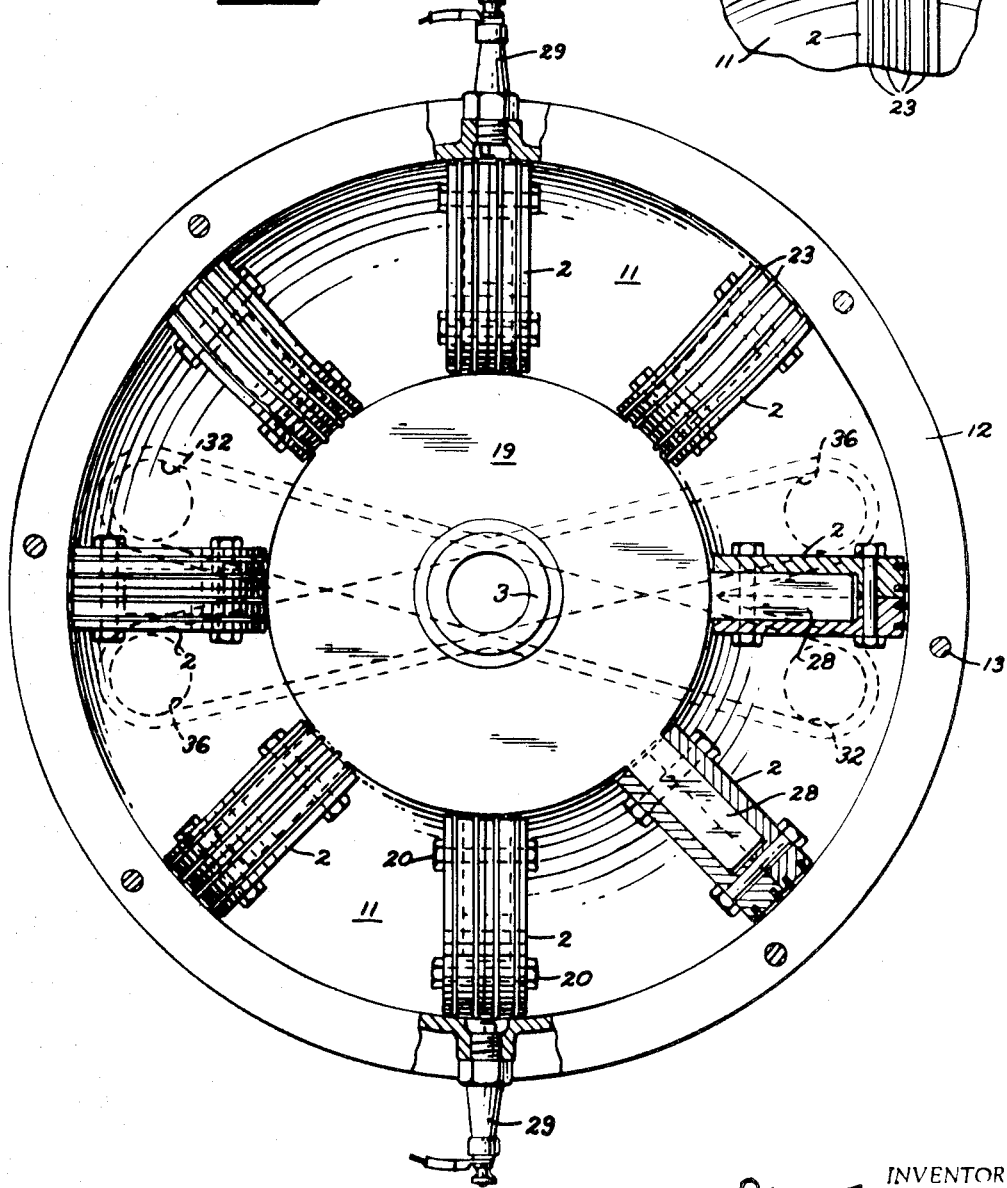
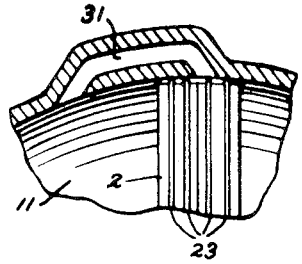

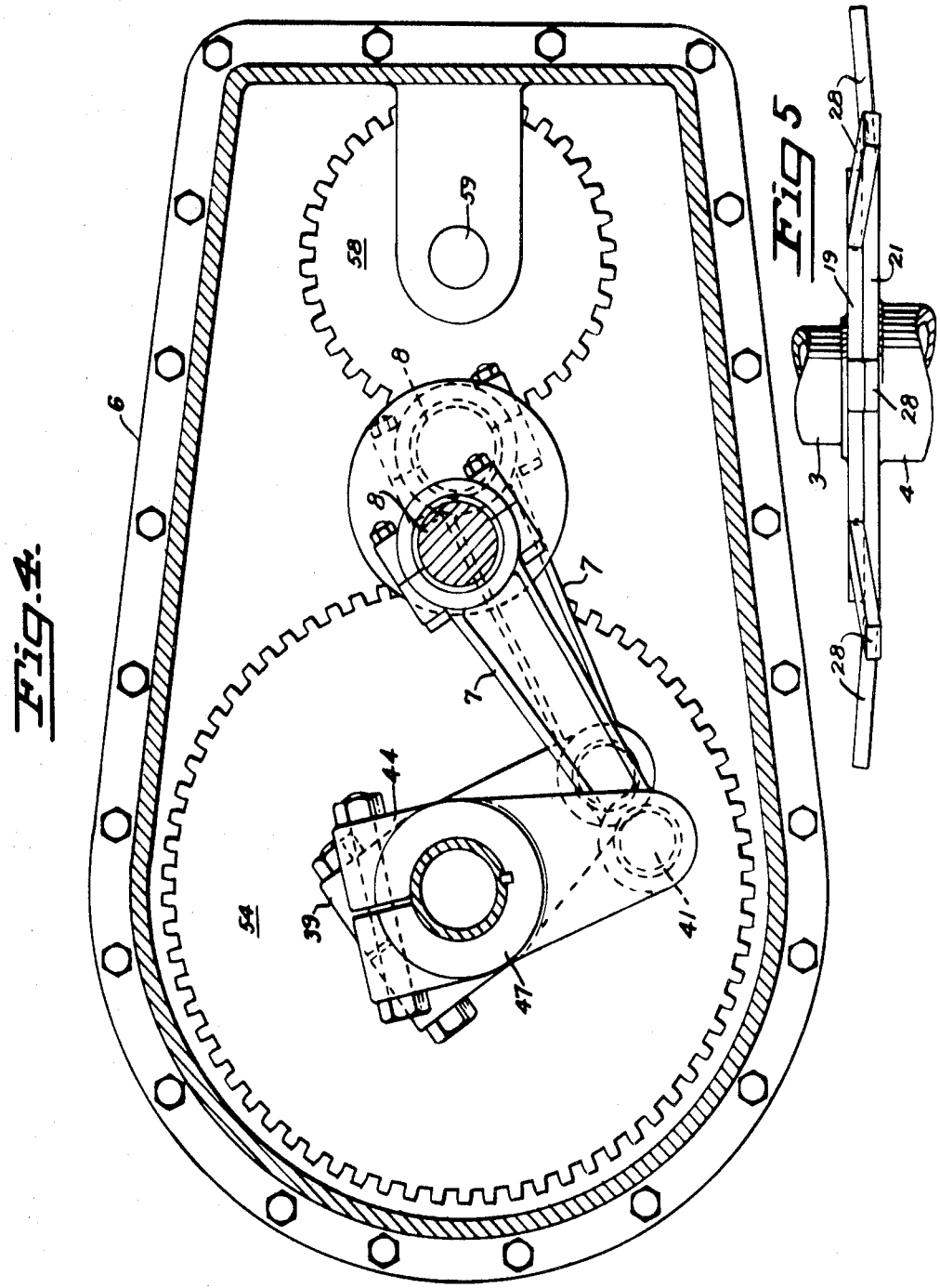

June 23, 1970   P. E. MORGAN   3,516,392
OSCILLATING PISTON INTERNAL COMBUSTION ENGINE
Filed July 1, 1968   5 Sheets-Sheet 4
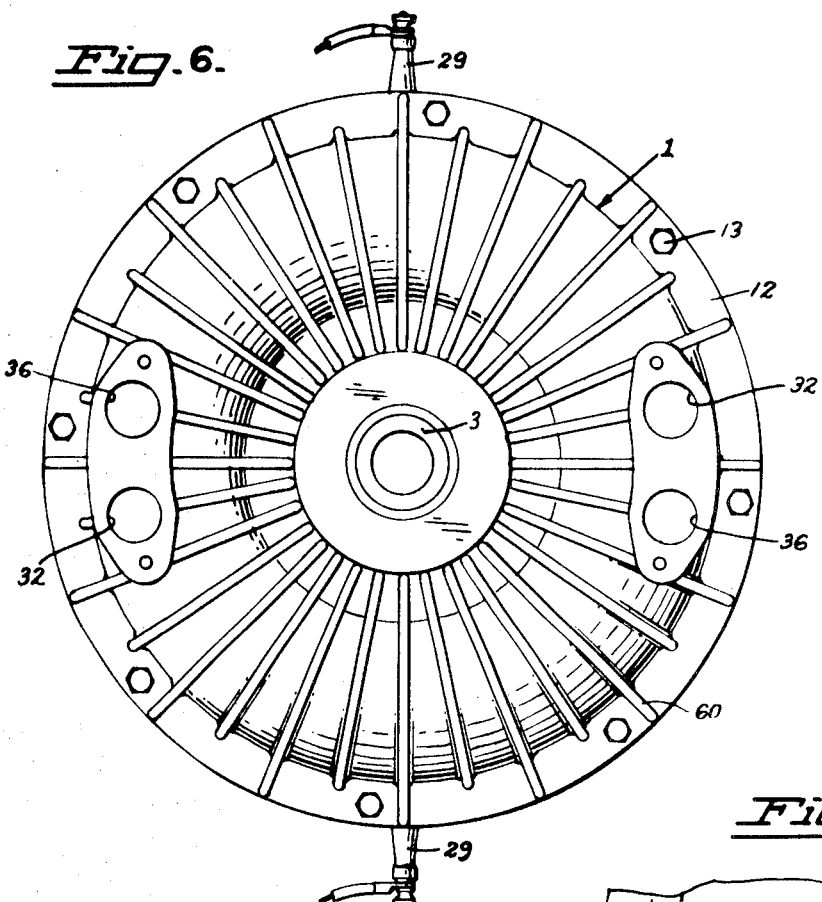
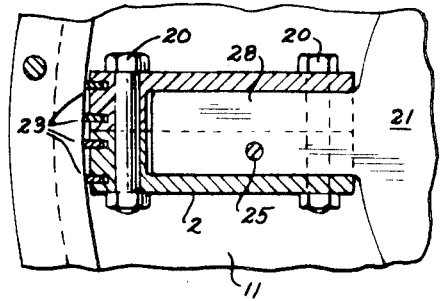
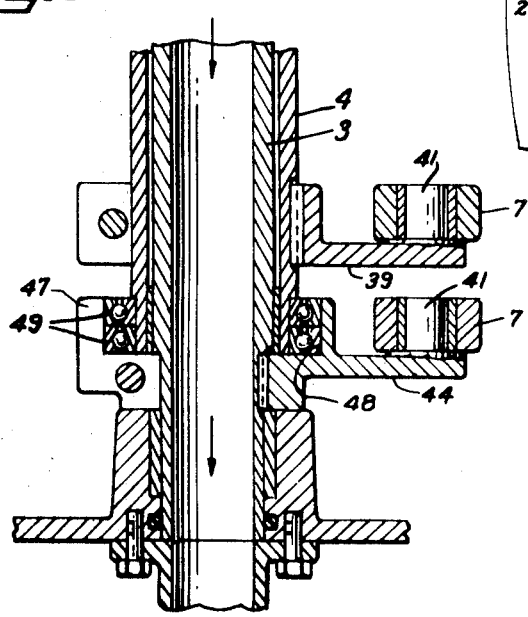
INVENTOR.
PAUL E. MORGAN
BY George B. White
ATTORNEY.

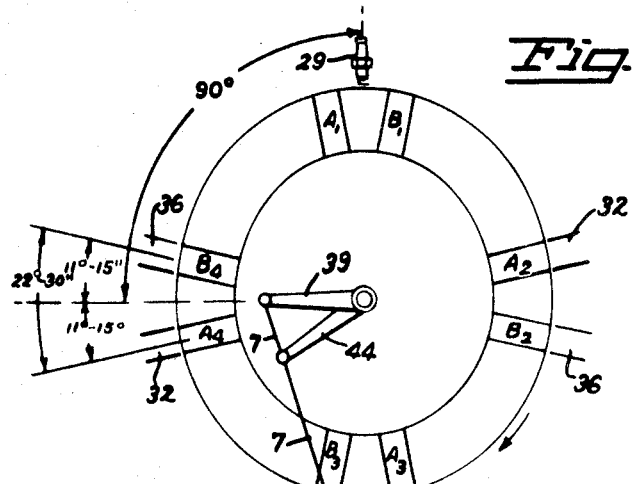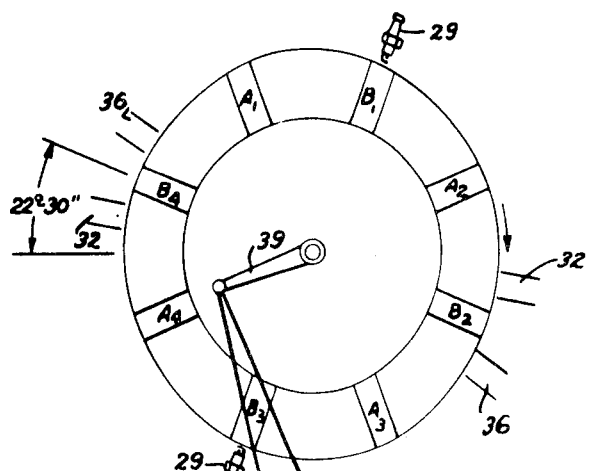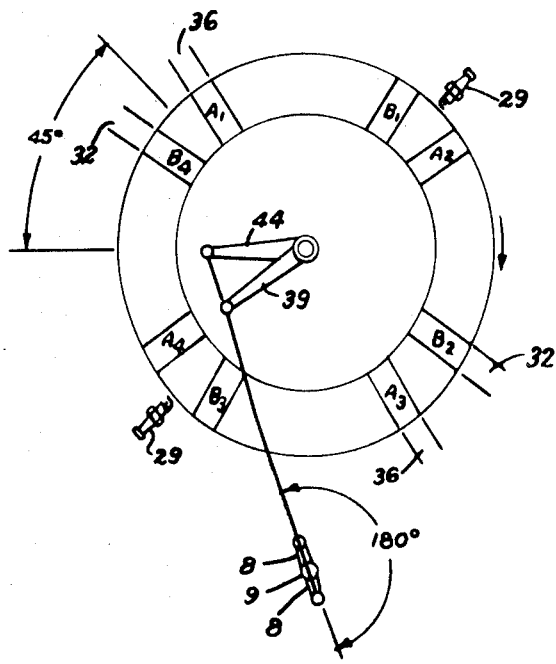

# United States Patent Office 3,516,392
Patented June 23, 1970

3,516,392
OSCILLATING PISTON INTERNAL
COMBUSTION ENGINE
Paul E. Morgan, San Jose, Calif., assignor to
Bruce Wiley
Filed July 1, 1968, Ser. No. 741,647
Int. Cl. F02b *57/00, 53/00*
U.S. Cl. 123—43
8 Claims

ABSTRACT OF THE DISCLOSURE

In an internal combustion engine, a rotating annular cylinder is rotated in a predetermined ratio to oscillation of a plurality of pairs of oscillating pistons in the cylinder, the pistons being so oscillated so that adjacent pistons are moved alternately apart from one another and toward one another for the respective strokes of the internal combustion engine. Intake port, exhaust ports and ignition means on said rotating annular cylinder are located by the rotation of the cylinder between adjacent pistons according to the firing order and cycle of said engine.

BACKGROUND OF THE INVENTION

The improvements herein are primarily to create efficient developing of power and efficient transmission of the power between oscillating pistons and a power shaft or crankshaft; particularly wherein pistons oscillate inside an annular cylinder or tubular ring which latter is rotated at such ratio to the oscillation of the pistons as to determine the cycles of the internal combustion engine in accordance with the relative positions of the pairs of pistons in the ring; the tubular ring is supported in a horizontal plane and the pistons are properly centered so as to facilitate transmission between the oscillating pistons and the crankshaft of the engine; intake and exhaust are accomplished in an advantageous manner; the improvements herein result in a better balanced, more efficient internal combustion engine.

DESCRIPTION OF FIGURES

FIG. 2 is a partly sectional plane view of the engine with one-half of the annular cylinder or ring removed.
FIG. 3 is a fragmental sectional view showing an alternate firing system by a by-pass passage.
FIG. 4 is a horizontal sectional view through the crankcase showing the transmission between the crankshaft and the oscillating tubes and the ring drive gear, the section being taken on lines 4—4 of FIG. 1.
FIG. 5 is a fragmental view of the tubes at the top of the outer tube showing the slanting of the piston support arms.
FIG. 6 is a top plan view of the cylinder of the engine with the manifolds removed.
FIG. 7 is a sectional detail view of one of the pistons in the cylinder.
FIG. 8 is a fragmental sectional detail view showing the mounting of the connecting crank arms on the oscillating tubes.
FIGS. 9, 10 and 11 are diagrammatic views illustrating the relative positions of the pistons and of the intake and exhaust ports and of the ignition means during a complete cycle of operation.

DETAILED DESCRIPTION

Figure 1:
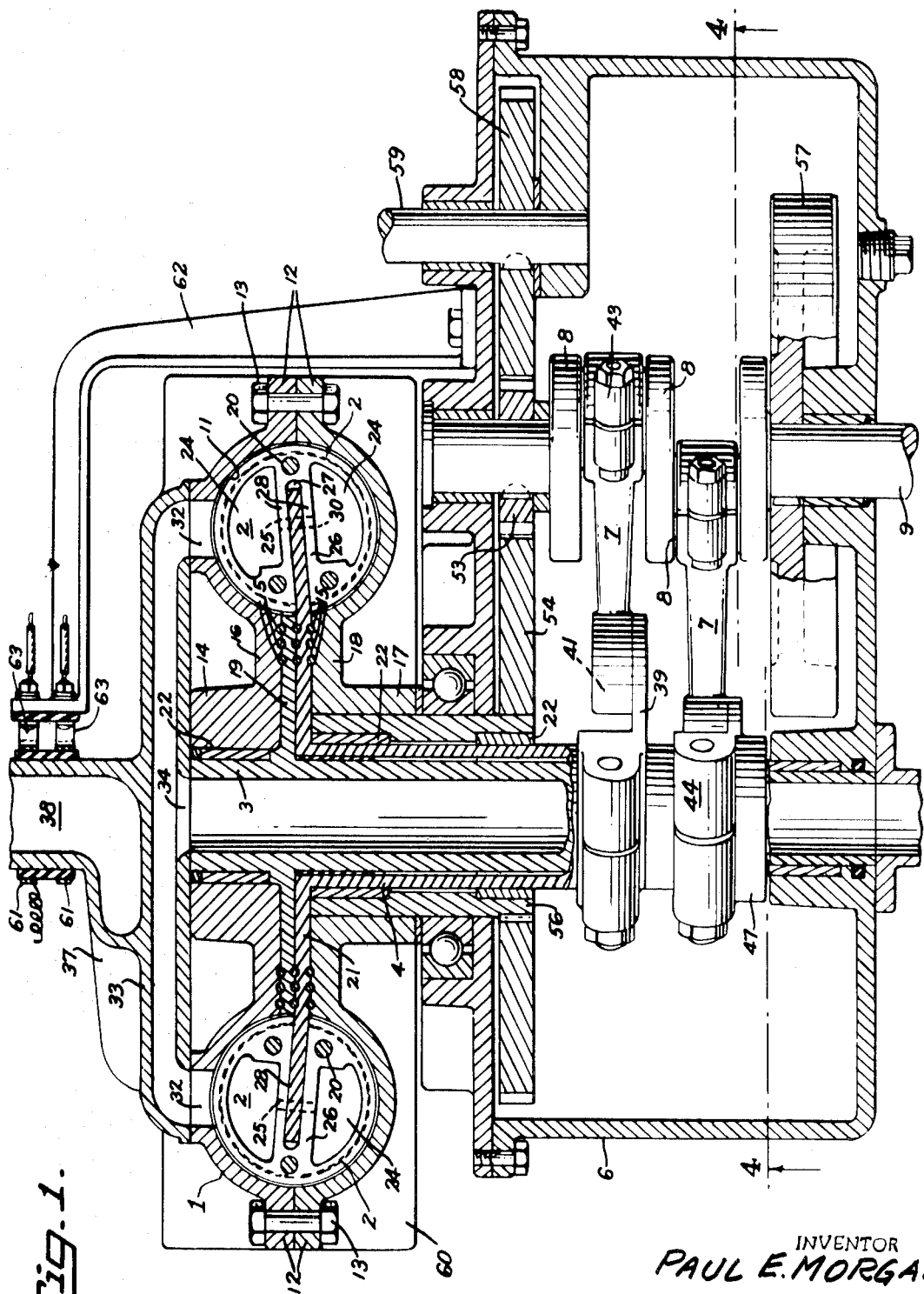
FIG. 1 is a cross-sectional view of the engine.

In the embodiment of the invention herein shown an annular cylinder or ring 1 contains diametrically opposite pairs of pistons 2. The pistons 2 are alternately connected to one or the other of a pair of concentric tubes 3 and 4 which latter are generally concentric with the ring 1.

The ring 1 is rotatably supported on suitable bearings on a crankcase 6 into which the oscillating tubes 3 and 4 also extend. Each of the tubes 3 and 4 is connected by a suitable connecting rod 7 to a crankthrow 8 of a crankshaft 9 which latter is journalled in the crankcase 6 on an axis parallel with the axis of the tubes 3 and 4 and with the axis of rotation of the ring 1. The crankshaft 9 is in turn connected by suitable transmission gearing to the hub of the ring 1 so as to rotate it, in this illustration at a 4 to 1 ratio with respect to the rotation of the crankshaft 9.

The annular cylinder or ring 1 is constructed of a pair of super-imposed half-cylindrical sections which complement one another to form the interior circular cylindrical chamber 11. Each of the half-sections of the annular cylinder or ring 1 has an annular exterior flange 12 which flanges 12 are secured together by suitable bolts 13 spaced around the outer periphery of the annular cylinder or ring 1.

The upper annular ring section has a hub 14 connected by an annular flat web 16 to the annular cylinder or ring 1. The lower cylinder section has a hub 17 connected by a web 18 to the lower half of the anular cylinder or ring 1. The hubs 14 and 17 and webs 16 and 18 are recessed and spaced from one another to accommodate therebetween circular oscillating flanges 19 and 21 respectively extended from the inner and outer tubes 3 and 4. The oscillating flanges 19 and 21 are provided with suitable O-rings 15 on both faces thereof for the purpose of sealing the clearance spaces therebetween. These oscillating flanges 19 and 21 are slidable relatively to one another and relatively to the webs 16 and 18.

The upper and lower hubs 14 and 17 have suitable bearings 22 therein to hold the oscillating tubes 3 and 4 aligned. The inner tube 3 extends into and to the top of the upper hub 14. The outer tube 4 extends only up to the upper oscillating flange 19.

The assembled outline of each piston 2 is cylindrical and conforms to the curvature of the chamber 11 of the cylinder or ring 1. Each piston 2 is provided with suitable piston rings 23 on its periphery to seal the periphery in the usual manner.

Each piston is constructed in at least two complemental cylindrical sections. Each section has interior sealed cavities 24 therein. A rib 26 of one of the sections has a socket 27 therein which is generally radial with respect to the ring 1. The socket 27 is, however, slightly slanted so as to accommodate an arm 28 extended from the periphery of the respective flange 19 or 21. Inasmuch as the intermediate facing planes between the flanges 19 and 21 are generally aligned with the central plane of the ring 1, the arms 28 from the respective flanges are slanted toward the center plane so that the outer ends of the arms are in registry with the center plane of the ring 1 and thus are balanced in the respective pistons.

The arms 28 on the respective oscillating flanges alternate. Thus the series of pistons are alternately connected to the flanges 19 and 21. The slanting of the arms 28 to the central plane of the cylinder ring 1 is of importance for the application of balanced forces on the pistons.

In the present illustration there are four pairs of pistons 2, namely four pistons 2 attached to four radial arms 28 of each flange 19 and 21. The tubes 3 and 4 are oscillated generally oppositely to one another so as to move the pistons 2 of each pair in opposite directions either toward one another or apart from one another.

It is to be noted that each converging arm 28 extends into a socket 27 of one of the piston sections, each piston 2 being formed with two complemental half sections. A dowel pin 25 is forced through the arm 28 and fits into corresponding recess 30 in the rib 26 of the adjacent piston section. The other piston section is then placed over the first piston section so that it engages the arm 28. Bolts 20 extended through registering holes in both piston sections secure the piston sections together in aligned position.

The ring 1 has thereon a pair of diametrically opposite ignition means which in FIG. 2 is in the form of usual spark plugs 29. The alternative form is an igniting slot 31, shown in FIG. 3, arranged to transmit fire at a predetermined cycle from the exhaust side to the compression side of a piston 2 in proper relation.

In the top half section of the cylinder ring 1 are diametrically opposite intake ports 32 which are connected by an intake manifold 33 extending diametrically across the top of the ring 1. This intake manifold 33 is also connected by a central port 34 to the interior of the inner tube 3 which inner tube serves for conducing fuel to the intake port 34 and to the intake manifold from a suitable source of fuel supply, not shown.

A pair of diametrically opposite exhaust ports 36 in the upper section of the annular cylinder or ring 1 are offset about 22½° from the respective intake ports 32 and are connected by a generally diametrical exhaust manifold 37 to an exhaust pipe 38.

The rate of oscillation of the pistons 2 is accomplished by the particular arrangement of the connecting rods 7 with respect to tubes 3 and 4.

On the lower end of the outer tube 4 is bolted and keyed a crank arm 39. To the crank arm 39 is suitably journalled by a crank pin 41 the connecting rod 7 the other end of which connecting rod 7 is mounted by a suitable bearing 43 in the usual manner on one of the crank throws 8 of the crankshaft 9.

Another crank arm 44 is similarly bolted and keyed to the lower end of the inner tube 3 and is similarly connected by another connecting rod 7 to the other crank throw 8 of the crankshaft 9. The hub 47 of the lower connecting arm 44 has therein a socket 48 containing ball bearings 49 upon which the lower end of the outer tube 4 rests.

The crank throws 8 are 180° apart on the crankshaft 9. The crank arms 39 and 44 are at such an angle as to oscillate the respective pistons 2 in accordance with the cycle of operation as determined by the rotation of the annular cylinder or ring 1. The crankshaft 9 is connected to the ring 1 by a gear 53 and a gear 54 in a 1 to 4 ratio. The gear 54 is suitably keyed on a hub tube 56 fixedly secured within the lower hub 17 of the cylinder, the annular cylinder or ring 1 is rotated once for every four revolutions of the crankshaft 9. Therefore during each full revolution of the annular cylinder or ring 1 each pair of pistons 2 must move toward one another and apart from one another eight times. The stroke of movement of each piston 2 in either direction is one-sixteenth of a revolution, namely 22½°. Accordingly the crank arms 39 and 44 are at a 22½° included angle about the center of oscillation when the crank throws 8 are in the extereme positions in extension of the connecting rods 7 as show in FIGS. 9 and 11.

A suitable flywheel 57 is mounted on the crankshaft 9 in the bottom of the crankcase 6. Another gear 58 on a timing gear shaft 59 is in mesh with the drive gear 53. for suitable timing of the ignition in well known manner.

The order of firing and oscillation is shown in diagrams in FIGS. 9, 10 and 11. For the purpose of illustration, the pistons 2 connected to the crank arm 39 on the inner tube 3 are marked in these diagrams in sequence, A1, A2, A3 and A4, and the pistons 2 connected to the outer tube 4 and operated by the crank arm 44 are in corresponding sequence indicated by B1, B2, B3 and B4.

The diagram in FIG. 9 corresponds to the position of the crankshaft 9 and the crank arms 39 and 44 shown in FIG. 4. In this position the pairs of pistons A1 and B1 and A3 and B3 completed the compression stroke and are in position for firing by the ignition spark plug or by the alternative firing by-pass. The other pairs of pistons A2 and B2 and A4 and B4 just completed their respective exhaust strokes and expelled the products of combustion from the space between them. The spaces between A1 and B4 and A3 and B2 are respectively expanded as the power strokes are about completed and these spaces are now ready for the exhaust stroke. The spaces between B1 and A2 and B3 and A4 have been fully expanded as the intake strokes have been just completed and these spaces are ready for the respective compression strokes. The annular cylinder or ring 1 rotates in a clockwise direction viewing FIGS. 9, 10 and 11, and in opposite direction to the rotation of the crankshaft 9. The adjacent exhaust and intake ports 32 and 36 are paired respectively in diametrically opposite sides of the ring, and in each pair the intake port and the exhaust port are 22½° apart to correspond to the 4 to 1 ratio of rotation between the annular cylinder 1 and the crankshaft 9, and to the corresponding stroke of oscillation of the pistons 2. As the shaft rotates 90° from the position shown in FIG. 9 to the position shown in FIG. 10, the crank arm 39 is oscillated in a counter-clockwise direction viewing FIG. 9 and the crank arm 44 in clockwise direction viewing FIG. 9. Each arm is oscillated about 11¼° so that they are substantially superimposed one above the other. Correspondingly the pistons A1, A2, A3 and A4 are moved one-half of their stroeks in a counter-clockwise direction viewing FIG. 9 and the pistons B1, B2, B3 and B4 are moved in clockwise direction viewing FIG. 9. This corresponds to the power stroke while A1 and B1 are moved apart as well as to the power stroke between A3 and B3 moving apart. At the same time B1 and A2 moving together compress the fuel therebetween as well as between B3 and A4.

The spaces between the pistons A2 and B2, as well as the pistons A4 and B4 moving apart are aligned with the opposite respective inlet ports 32 and continue the intake of the fuel mixture. The pistons A1 and B4 and the opposite pistons A3 and B2 continue to move together for the exhaust stroke between them as aligned with the respective exhaust ports 36 of the annular cylinder or ring 1. Further rotation of the crankshaft another 90° from the position shown in FIG. 10 to the position shown in FIG. 11 another 90° namely a total of 180° from the position shown in FIG. 9 oscillates the crank arm 44 in a counter-clockwise direction into the previous position of the crank arm 39, and oscillates the crank arm 39 in a clockwise direction into the initial position of the crank arm 44, viewing FIG. 10, thereby completing the expansion of power stroke between the pair of pistons A1 and B1 and A3 and B3 as well as completing the exhaust stroke between the pistons A1 and B4 and A3 and B2 and the compression stroke respectively between pistons B1 and A2 and B3 and A4. As compared between FIG. 9 and FIG. 11 during the full stroke of the pistons in one direction of ¼ of an arc of the circle the annular cylinder or ring also moves 45°, or one eighth of a revolution, and thereby advances the spark plug or ignition means to the position between the pistons B1 and A2 on one side and B3 and A4 on the other side for the next firing.

It is to be noted that the exhaust and intake openings are equally spaced angularly from a diameter of the ring 1 at right angles to the diameter which extends through the opposite ignition means or spark plugs. Therefore the exhaust opening is advanced so as to approach the space between A1 and B1 for the next consecutive exhaust stroke. The other diametrically opposite ports are correspondingly shifted.

By continued rotation of the crankshaft 9 over the other half of revolution the previously described cycle of operation is repeated in sequence between the consecutive pairs of pistons.

The power generated by the power stroke is transmitted through the flange arms 28 and the respective tubes 3 and 4 to the crank arms 39 and 44 and through the connecting rods 7 to the crankshaft 9 to cause the rotation of the crankshaft 9. In turn the rotation of the crankshaft 9 transmitting power in the usual manner, rotates the annular cylinder or ring 1 in a clockwise direction and by reason of the oscillation of the tubes 3 and 4 the strokes of the respective pistons 2 are correspondingly shifted into the successive positions for operation in the firing order heretofore described.

The cylinder is cooled by suitable radial fins 60. Electric current is conveyed to the spark plugs 29 through insulated conductor rings 61 on the exhaust pipe 38, which rings 61 are suitably connected to respective spark plugs 29. A bracket 62 extends from the casing 6 and supports suitable brushes 63 in contact with the respective rings 61. The brushes are connected in the usual timing circuit, not shown.

I claim:
1. In an internal combustion engine,
  (a) a rotating annular cylinder,
  (b) a plurality of pairs of oscillating pistons in said cylinder,
  (c) means to oscillate said pistons so as to alternately move adjacent pistons apart from one another and toward one another for the respective strokes of the internal combustion engine,
  (d) intake ports, exhaust ports and ignition means on said rotating annular cylinder for registry with the respective spaces between the adjacent pistons according to the firing order and cycle of said engine,
  (e) a power take-off shaft in said engine,
  (f) means to convert the oscillating of said pistons into rotation of said power take-off shaft,
  (g) transmitting means between said power take-off shaft and said cylinder to rotate said annular cylinder in a predetermined ratio to the oscillation of said piston for registering said intake ports, exhaust ports and ignition means with the respective spaces between said oscillating pistons in a predetermined sequence,
  (h) the ratio between the rotation of said shaft and the resulting angular oscillation of said pistons with respect to the rotating annular cylinder is one oscillation of each piston for each quarter of one revolution of said cylinder,
  (i) the inner periphery of the cylinder being of circular cross-section and said pistons being also of circular cross-section, and piston rings on said pistons being in contact with the inner circular periphery of said cylinder,
  (j) said means to convert said piston oscillation into rotation including concentric tubes journalled concentrically with said rotating cylinder,
  (k) superimposed flat radial members extending from the respective tubes to the inner periphery of said rotating cylinder,
  (l) said flat radial members being slideable relatively to one another according to relative turning movement of said tubes,
  (m) piston supporting arms extended from the respective radial members into the adjacent pistons so that said pistons are connected alternately to the respective radial members,
  (n) connecting means between the tubes and the shaft for converting oscillation of the tubes into rotation of the shaft,
  (o) a crankcase,
  (p) journal means on said crankcase to support said rotating cylinder in a generally horizontal plane,
  (q) hub means on said cylinder,
  (r) connecting webs extended from said hub means to the annular cylinder,
  (s) each of said radially extended arms converging to the horizontal center plane of said rotating cylinder for supporting the respective pistons in balanced position in said cylinder,
  (t) said flat radial members being horizontal flanges extending from said tubes through said web to the inner periphery of said annular cylinder and being angularly slideable relatively to one another and to said web,
  (u) said arms extending from the respective flanges alternately into the respective pistons to support said pistons in balanced position in said cylinder,
  (v) said oscillation converting means including connecting devices between the respective tubes and said shaft for oscillating said tubes oppositely to one another during the rotation of said shaft,
  (w) said inner tube being connected to a fuel vapor intake, and
  (x) an intake manifold on said rotating cylinder connected to the said intake ports, said inner tube discharging into said intake manifold.

2. The invention defined in claim 1 and
  (y) each piston being made of two complemental cylindrical sections,
  (z) means to secure said supporting arm between said piston sections,
  (aa) means to align and secure said sections together, and
  (bb) each supporting arm being in registry with the center plane of said cylinder.

3. In an internal combustion engine of the character described,
  (a) a crank case,
  (b) an annular cylinder,
  (c) a hub of said annular cylinder rotatably journalled on said crank case,
  (d) a web connecting the hub to the cylinder,
  (e) an inner tube and an outer tube concentrically journalled in said crank case and in said hub,
  (f) an annular flange extended from each tube through said web to said cylinder and being confined in said web so as to be angularly oscillatable relatively to the adjacent flange and said web,
  (g) a plurality of circumferentially equally spaced arms extended from each flange into said cylinder,
  (h) the arms of one flange being staggered equidistantly relative to the arms of the other flange,
  (i) a piston supported on each arm in said cylinder, said pistons being circumferentially spaced from one another,
  (j) a crankshaft journalled in said crank case,
  (k) connecting means between said crank shaft and said tubes for oscillating said tubes angularly about the axis of said cylinder and oppositely to one another for the respective strokes of said pistons by the rotation of the crankshaft and to transmit power from said tubes to said crankshaft,
  (l) circumferentially spaced inlet port, outlet port and ignition means on said cylinder,
  (m) means to transmit rotation from said crankshaft to said cylinder so as to register said ports and said ignition means with the respective spaces between said pistons in a predetermined sequence relative to the respective strokes of said pistons,
  (n) the axis of rotation of said cylinder and of said crankshaft being parallel,
  (o) an intake manifold on said cylinder connected to said intake port, and
  (p) said inner tube extending to said intake manifold at one end thereof and through said crankcase at its other end and being connectable at said other end to a combustible fuel supply.

4. In an internal combustion engine defined in claim 3, and
  (q) the adjacent surfaces of said web and said flanges are of such relative hardness as to permit relative sliding contact therebetween, said surfaces having annular grooves therein, and
  (r) annular packing elements positioned in said grooves.

5. In an internal combustion engine defined in claim 3, said ignition means comprising,
- (q) a by-pass in the wall of said cylinder having its ends open to the inside of said cylinder and spaced apart to straddle a piston in the firing position of said piston to transmit exhaust fire from one side of the piston to the compressed fuel mixture on the other side of the piston.

6. In an internal combustion engine defined in claim 3, wherein four pairs of said pistons are provided in diammetrically opposite symmetrical arrangement, and wherein the ratio of rotation of the cylinder to the oscillation of the pistons is one revolution of the cylinder for eight strokes of oscillation of each piston.

7. In an internal combustion engine defined in claim 3, wherein said cylinder is formed of a pair of superimposed complemental rings of semi-cylindrical cross-section, and
- (q) a hub section on each ring forming said hub means,
- (r) web section extended from each hub section to each ring,
- (s) said hub sections and said web sections being spaced so as to accommodate said oscillating flanges therebetween.

8. In an internal combustion engine as defined in claim 7, and
- (t) each stroke of oscillation of each piston coinciding to about one-sixteenth of a revolution of the cylinder,
- (u) an inlet port and an exhaust port located in a pair spaced circumferentially on the cylinder about twenty-two and a half degrees apart, and diametrically opposite of another paired inlet port and exhaust port,
- (v) said ignition means being at diammetrically opposite areas of said cylinder and circumferentially at about right angles from the respective pairs of inlet and exhaust ports.

References Cited
UNITED STATES PATENTS

| | | |
|---|---|---|
| 1,250,859 | 12/1917 | Grimmett et al. |
| 1,294,487 | 2/1919 | Laberge. |
| 1,695,888 | 12/1928 | Dowdey. |
| 1,821,139 | 9/1931 | Bullington. |
| 2,968,290 | 1/1961 | Bradshaw _____ 123—18 |
| 3,385,272 | 5/1968 | Winogrodzki et al. |

WENDELL E. BURNS, Primary Examiner

U.S. Cl. X.R.

123—18